United States Patent
Ricci et al.

(10) Patent No.: US 7,069,829 B2
(45) Date of Patent: Jul. 4, 2006

(54) RADIAL FEED FACING HEAD FOR BORING BAR

(75) Inventors: Donato L. Ricci, W8477-162nd Ave., Hager City, WI (US) 54014; Martin A. Gardzinski, Red Wing, MN (US)

(73) Assignee: Donato L. Ricci, Hager City, WI (US)

( * ) Notice: Subject to any disclaimer, the term of this patent is extended or adjusted under 35 U.S.C. 154(b) by 0 days.

(21) Appl. No.: 11/066,333

(22) Filed: Feb. 24, 2005

(65) Prior Publication Data

US 2005/0155470 A1    Jul. 21, 2005

Related U.S. Application Data

(63) Continuation-in-part of application No. 10/758,627, filed on Jan. 15, 2004, now Pat. No. 6,990,878.

(51) Int. Cl.
*B23B 41/00* (2006.01)

(52) U.S. Cl. .................. 82/113; 82/1.4; 408/80; 408/102; 408/138; 408/181

(58) Field of Classification Search .............. 408/79, 408/80, 81, 102, 101, 110, 138, 142, 139, 408/54, 181; 82/113, 1.2, 1.4
See application file for complete search history.

(56) References Cited

U.S. PATENT DOCUMENTS

| | | | | |
|---|---|---|---|---|
| 2,040,273 | A | * | 5/1936 | Rottler ................. 408/111 |
| 4,573,837 | A | | 3/1986 | Flaten |
| 4,652,186 | A | | 3/1987 | Sverdlin |
| 4,656,898 | A | | 4/1987 | Hunt et al. |
| 4,668,133 | A | | 5/1987 | Campbell et al. |
| 4,932,814 | A | | 6/1990 | York |
| 5,030,041 | A | | 7/1991 | Marron |
| 5,183,365 | A | * | 2/1993 | Silk ..................... 408/80 |
| 5,642,969 | A | | 7/1997 | Strait |
| 6,447,220 | B1 | | 9/2002 | Ricci et al. |
| 6,705,185 | B1 | | 3/2004 | Bruggemann |

* cited by examiner

*Primary Examiner*—Boyer D. Ashley
*Assistant Examiner*—Sara Addisu
(74) *Attorney, Agent, or Firm*—Thomas J. Nikolai; Nikolai & Mersereau, P.A.

(57) ABSTRACT

A portable boring/facing machine using a single drive motor for rotating a boring bar and for either axially translating a cutting head assembly along the bar or radially moving the blade of the cutting head assembly using a lead screw. The machine utilizing two mounting brackets is attachable to the workpiece for alignment with the workpiece.

6 Claims, 9 Drawing Sheets

RADIAL FEED FACING HEAD FOR BORING BAR

BACKGROUND OF THE INVENTION

This application is a continuation-in-part of application Ser. No. 10/758,627, filed Jan. 15, 2004, now U.S. Pat. No. 6,990,878 and is incorporated herein in its entirety.

I. Field of the Invention

This invention relates generally to metal working machines, and more particularly to a portable boring bar assembly with a radial feed head that can be used to rebore cylindrical apertures and/or to reface flange surfaces such as may be found on valves and other pipe or casing fittings in the field.

II. Discussion of the Prior Art

Portable boring bars are well known in the art. They generally consist of an elongated, cylindrical bar having a tool bit mounted thereon where the cylindrical bar is journaled for rotation in a frame attachable to the workpiece. A first drive member rotates the bar and a second drive member provides axial feed to the bar and the first drive member. This general construction can be recognized in several patents including the York U.S. Pat. No. 4,932,814, the Flaten U.S. Pat. No. 4,573,837 and the Sverdlin U.S. Pat. No. 4,652,186.

For example, in the York '814 patent, there is described an arrangement in which a cylindrical boring bar is journaled for rotation in a pair of supports and is adapted to translate the boring bar and its rotary drive motor assembly. A boring tool is mounted along the length of the boring bar and projects radially there from for engaging the wall of a cylindrical bore to be refurbished.

The Ricci et al. U.S. Pat. No. 6,447,220 B1 improved upon these by providing a much more facile machine where the mechanism for rotating the boring bar as well as the drive for translating the cutting head can be adjustably positioned anywhere along the length of the boring bar. While this was a remarkable improvement in terms of adjustability, simplification of alignment, available torque, radial displacement, and feed rate control, this design still required two separate and distinct drive members to accomplish radial and axial movement of the cutting head.

The present invention is advantageous over the prior art due to new concepts included in its simplified and scaled-back design. Some differences include a single drive member operating a feed screw that runs down the bore bar enabling both radial and axial feed of the head as well as an improved facing head design. The head has an actuating shaft that allows it to stop and feed radially using the same feed screw used for axial feed. Because this design creates an effective tool that can be adjusted radially and axially using a single drive member, there is a substantial increase in efficiency and reduction in the required cost.

SUMMARY OF THE INVENTION

The present invention provides for a boring/facing machine comprising an elongated, generally cylindrical, rigid boring bar member that is journaled for rotation in a pair of spaced-apart mounting brackets attachable to the workpiece to be refurbished. The boring bar supports a cutting head member thereon which rotates with the boring bar when the drive motor is activated and is capable of providing axial (longitudinal) translation of the cutting head member. Additionally, the axial translation may be stopped and radial movement of the cutting tool may be used for facing operations of flange surfaces instead.

Either axial translation along the length of the boring bar or radial movement of the cutting head is achieved by using a lead screw powered by the feeder motor. The lead screw is journaled for rotation within a channel or groove in the surface of the boring bar. The lead screw carries a traveling nut that engages the cutting head member and causes axial translation or radial movement.

These and other objects, features and advantages of the present invention will become readily apparent to those skilled in the art through a review of the following detailed description in conjunction with the claims and accompanying drawings in which like numerals in several views refer to the same corresponding parts.

DESCRIPTION OF A FIRST PREFERRED EMBODIMENT

The present invention represents broadly applicable improvements for portable bore bar assembly designed to rebore cylindrical apertures and to reface flange surfaces. The embodiments herein are intended to be taken as representative of those in which the invention may be incorporated and are not intended to be limiting.

Figure 1:
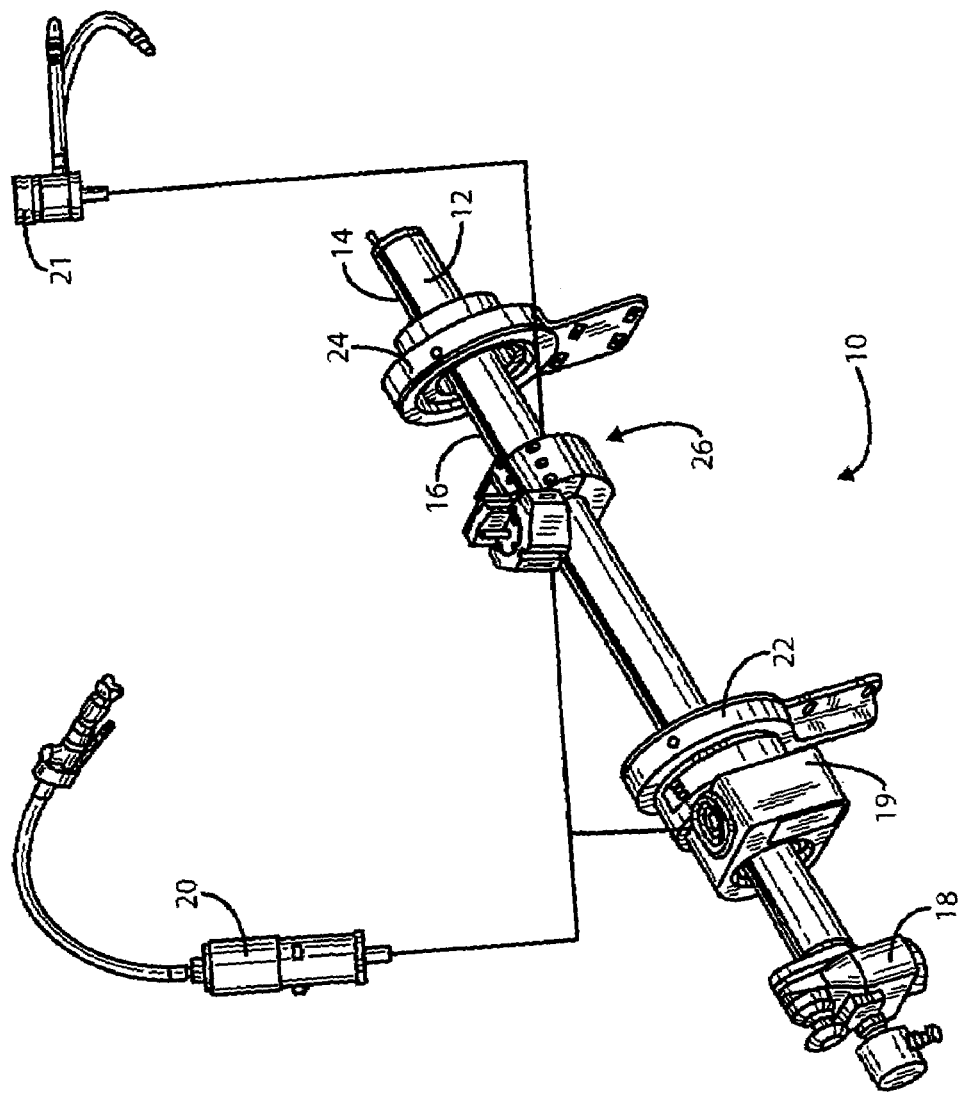
FIG. 1 is an isometric view of the boring bar of the present invention.

Referring first to FIG. 1, there is shown an isometric view of a bore bar assembly on which the radial feed facing head is mounted. The assembly itself is indicated generally by numeral 10 and includes an elongated, generally cylindrical, hardened steel bar member 12 that has a longitudinal groove 14 formed inwardly from a peripheral surface thereof. The groove extends the entire length of the bar member 12. Contained within the groove 14 is a threaded lead screw 16 that is journaled for rotation within that groove. It is driven by a feed motor 18 that is shown as being affixed to the left end of the bore bar member 12 in FIG. 1. Disposed about the bar member 12 and affixed to the mounting bracket 22 is a boring bar drive housing 19 which contains a gear transmission for rotationally coupling, either air motor, as at 20, or a hydraulic motor, as at 21, or an electric motor (not shown) to the drive housing 19 to effect the rotation of bar member 12 about its longitudinal axis. The feed motor 18 rotates with the bar member 12.

The bore bar member 12 is journaled for rotation in a pair of parallel, spaced-apart swivel mount brackets 22 and 24 that are adapted for attachment, either directly or indirectly, to a workpiece to be refurbished. Slidingly disposed about the boring bar member 12 is the radial feed facing head assembly 26. This assembly is operatively coupled to the lead screw 16 as to travel longitudinally along bar member 12 as the lead screw 16 is driven.

Figure 2:
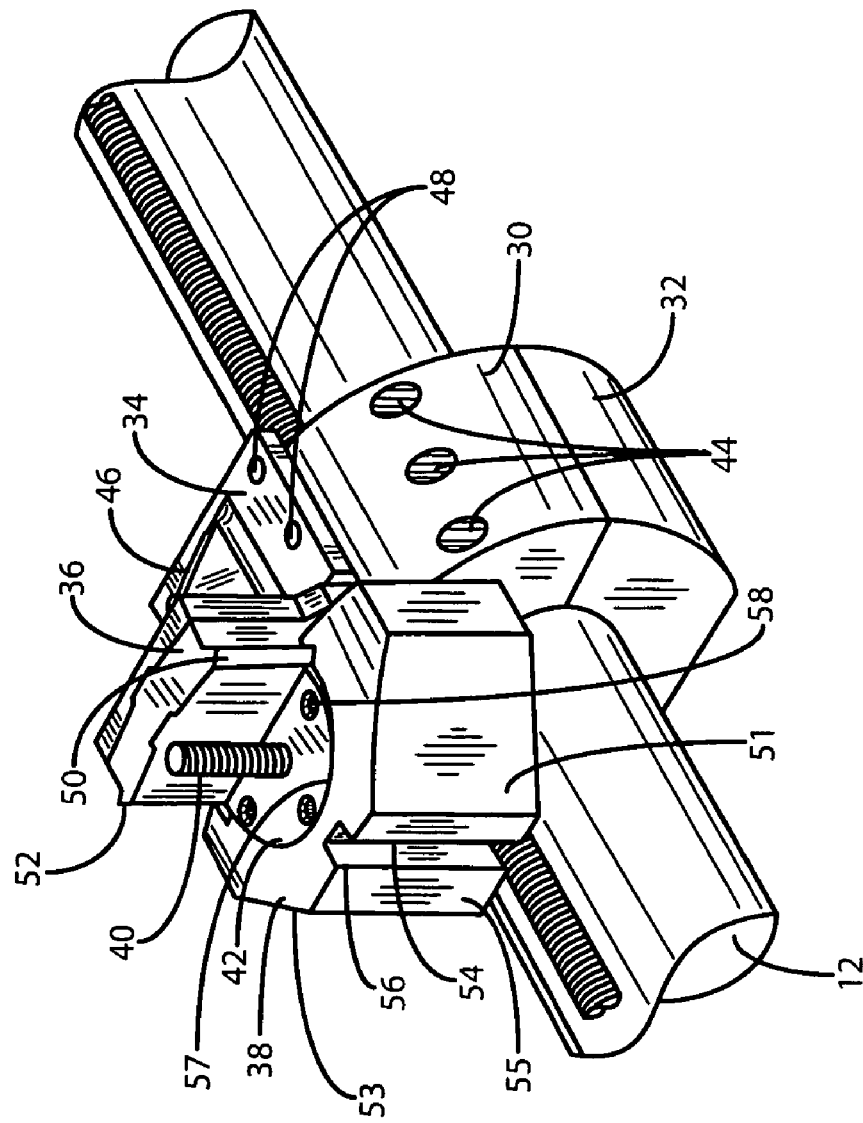
FIG. 2 is an isometric view of the bore bar facing head of the present invention.

With reference to FIG. 2, the radial feed facing head assembly 26 can be seen in greater detail. It is made up of two part radial covers 30 and 32, angle bracket 34, slide bracket 36, tool holder 38, radial feed screw 40, and screw feed nut 42. Radial covers 30 and 32 fit together to form a somewhat cylindrical casing around the internal gears and shaft components of the radial feed facing head assembly 26. The two cover pieces are affixed together using bolts in a row of holes 44 on each side of the bar member 12. Angle bracket 34 is generally an L-shaped piece of metal which sits atop the top radial cover 30. The angle bracket 34 is reinforced down its center by a triangular shaped wedge 46. Holes 48 for attachment to the top radial cover 30 and slide bracket 36 are located at the corners of the bottom and vertical faces of the angle bracket 34.

Slide bracket 36 is a largely rectangular block that abuts up against the vertical portion of the angle bracket 34 and the side of the radial cover 30. The bottom of this rectangular block has a number of mounting holes as well as an opening through which some of the inner gears extend. (See FIG. 4.) On the sides of the slide bracket 36 are triangular-shaped gibs 50 and 52 which protrude slightly outward. The gibs 50 and 52 guide the tool holder 38 as it moves up and down.

Tool holder 38 is a somewhat U-shaped block that slides up and down gibs 50 and 52. It has beveled corners 51 and 53 leading to a generally flat surface 55. Formed longitudinally in the surface 55 is a vertical slot 54 lined with holes 56, in which a cutting tool (not shown) can be mounted for facing operations. Tool holder 38 has a center cavity 57 containing gears which drive feed screw 40 to move the tool holder 38 up and down. Surrounding the radial feed screw 40 and located in the inner cavity of tool holder 38 and the upper radial feed housing 41 (See FIG. 4) is screw feed nut 42. Screw feed nut 42 is simply a threaded plate with several bolt holes 58 for mounting it to the tool holder 38.

Figure 3:
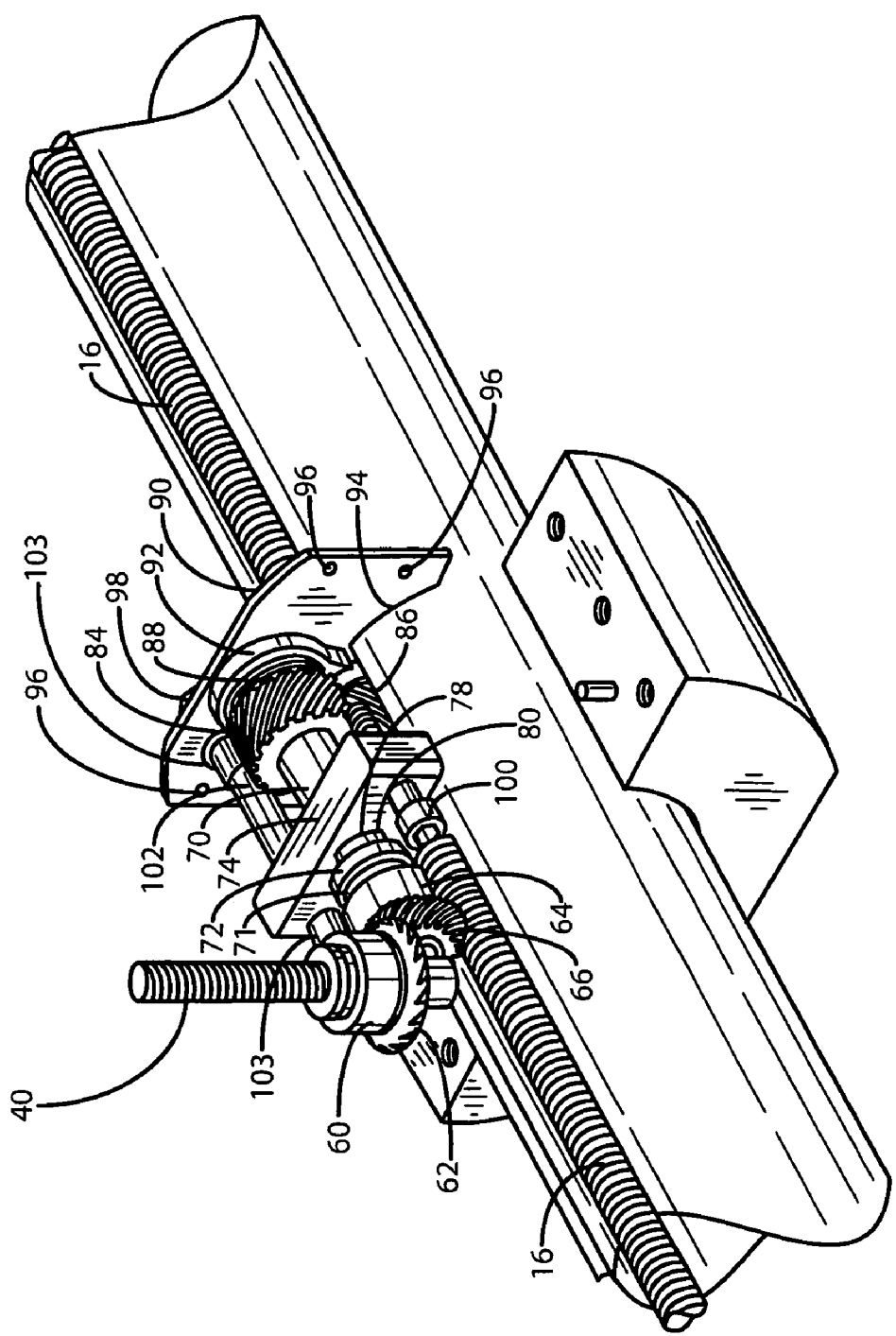
FIG. 3 is an isometric view of a partially assembled bore bar facing head of the present invention.

Referring now to FIG. 3, the radial feed facing head assembly 26 is shown with the top radial cover 30, angle bracket 34, slide bracket 36, tool holder 38, and screw feed nut 42 removed to show the internal gearing for axially translating the assembly 26 along the bore bar 12 or for radially displacing the facing head assembly 26.

Shown in FIG. 3 is the radial feed screw 40 that is responsible for directing the radial movement of a cutting tool performing a facing operation. The screw 40 projects perpendicularly to the bar member 12 and is threaded with a predetermined pitch. The inner end of radial feed screw 40 is set in a stationary block with a cylindrical and conical bore making up a lower feed housing 59. Within the lower feed housing 59, and surrounding the lower end of the radial feed screw 40, is a bronze feed-screw bushing 63. Feed-screw 40 has a square key 61 midway up its inner length (see FIG. 4) that is received in a correspondingly shaped bore in a spiral miter gear 60. Spiral miter gear 60 includes gear teeth 62. These gear teeth 62 are angled so as to mesh with the gear teeth 66 of an output gear 64. Output gear 64 and spiral miter gear 60 are oriented perpendicular to one another and are capable of converting a rotation about a horizontal axis into one which is vertically, radially directed. The output gear 64 is mounted axially on an adapter 69 (See FIG. 4) on the end of a radial feed shaft 70. It is the condition of the radial feed shaft 70 that determines whether the assembly carrying the tool bit will move axially along the boring bar 12 or will move radially relative to the boring bar.

Radial feed shaft 70 is surrounded by a number of components that are largely cylindrical and aligned axially. Moving down the shaft 70 from output gear 64, there is a thrust bushing 71, followed by a bearing 72 for journaling the shaft 70 in the radial cover member 30. The next component, moving to the right along the shaft 70, is a rectangular block referred to as nut 74. This nut is in the shape of a rectangular block except that the bottom face of the block is slightly sloped, and rests upon the sloped top of axial feed stop 76. (See FIG. 4.) Nut 74 has a bore 78 through which shaft 70 passes. This bore is lined by tapered collar 80 that is then keyed to a snap ring cone 75 (See FIG. 4) surrounding shaft 70. Next to the right on shaft 70 is a helical gear 84. Helical gear 84 engages with helical gear 86. This interaction is largely responsible for transferring rotational power from the threaded lead screw 16 to the radial feed shaft 70. Beyond gear 84 is a bushing 88 (See FIG. 4.) and bearing 89, which are supported by an end plate 90 in its circular flange 92 in which shaft 70 terminates. The plate 90 has a curved bottom 94 which abuts up against the outer circumference of the bar member 12. Holes 96 in the corners of plate 90 allow for attachment to the top radial cover 30.

FIG. 3 also shows a shaft 102 that is placed in spaced apart, parallel relation to shaft 70. This shaft 102 is located within a bore extending through the radial cover 30 (not shown). The shaft 102 rotates around bushings 103, located near each of its ends. The shaft 102 is also threaded around its perimeter for axial travel along nut 74. The final component on the end of shaft 102 is an end hex nut 98. (See FIG. 4.) This nut 98 is located on a short portion of shaft 102 that juts through end plate 90 and outside the radial cover 30. This nut 98 allows an operator to turn feed control shaft 102 using a box wrench or similar tool. Rotation of this nut results in engaging or disengaging the nut 74 with respect to the axial feed stop 76 or conversely engaging or disengaging nut 74 with respect to cone 80.

Also shown in FIG. 3 is a shoulder bolt 100. This component runs through nut 74 and fastens into radial cover 30 providing further stability to the assembly. The unthreaded portions of the shoulder bolt facilitate sliding movement of the nut 74 therealong when the shaft 102 is manually turned.

Figure 4:
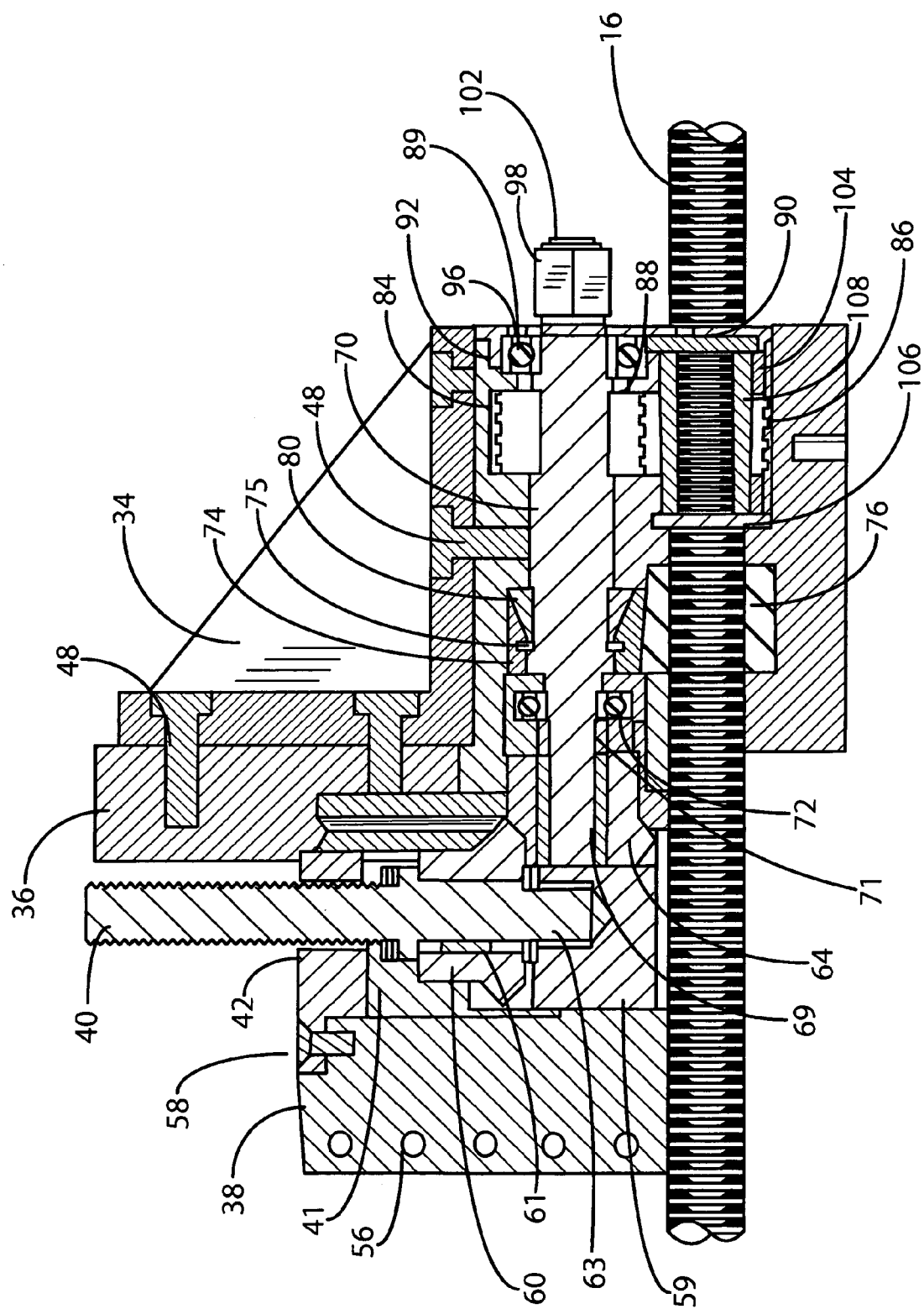
FIG. 4 is a cross-sectional side view of the bore bar facing head of the present invention.

FIG. 4 shows a side cross-section of the assembly where the remaining elements are disclosed. These include parts contained along the threaded lead screw 16, such as axial feed stop 76. The axial feed stop 76 is a somewhat rectangular block having a bore through which the threaded lead-screw 16 passes. The top face of the block is slightly sloped for engagement with the slanted bottom face of nut 74. Axial feed stop 76 moves a small amount up or down based upon the position of nut 74 on the feed control shaft 102. Also contained along the threaded lead screw 16 is the helical gear 86. Helical gear 86 has a hex shaped inside profile that rides on an internally threaded, externally hexed adapter. The outside of gear 86 has teeth that mesh with those of gear 84. Surrounding gear 86 are needle bearings 104 on both of its sides, which ride on bushings 106 to each side. Underneath the threads of the gear 84 is a threaded hex adapter 108. This hex adapter 108 fits to the hex shaped inside profile of gear 86. These comprise the components that allow for transfer of axial rotation of screw 16 to radial translation.

Further shown in FIG. 4 are the angle bracket 34, slide bracket 36, tool holder 38, feed screw 40, and feed nut 42. This figure discloses locations where bolts are used to secure these pieces together, such as at bolt-holes 48, 58, 96, etc. The holes 56 shown in the tool holder 38 represent the location where the tool blade would be mounted which would perform the facing operations.

Now that the details of the mechanical construction of radial feed facing head of the present invention have been described, consideration will next be given to its mode of operation. The present invention is capable of operating in both a mode of operation in which the feed facing head assembly 26 undergoes axial translation along the bar member 12 and a mode of operation in which the facing tool of the feed facing head assembly 26 moves in a radial direction. Both of these operations can be depicted and explained by primarily looking to FIG. 4.

When an axial translation operation is desired, the machine is first put in position and mounted within a work piece using the two swivel mount brackets 22 and 24. Next, the operator must turn end nut 98 so that the feed control shaft 102 causes the nut 74 to move to the right in FIG. 4, i.e., toward the gears 84 and 86. When the nut 74 travels in this direction, it engages the tapered collar 80 on the shaft 70 and prevents the shaft 70 from rotating. The operator starts the motor 18, which causes axial rotation of threaded lead screw 16. This causes the radial feed facing head assembly 26 to travel axially along the threaded lead screw 16 based on the rotating interaction between the lead screw 16 and the threaded hex adapter 108 driving the inner diameter of gear 86.

When a facing operation is desired requiring radial movement of the facing tool of the feed facing head assembly 26, the machine is positioned in the workpiece using the swivel mount brackets 22 and 24, as before. Next, the operator, using a wrench, turns the feed control shaft 102 in a direction such that nut 74 moves to the left, away from the gears 84 and 86. When the nut 74 travels in this direction, it pushes the axial feed stop 76 down so that it engages with the keyway and prevents axial feed. With the axial feed stop 76 so engaged, the gear train is free to rotate the radial feed head 26. Generally, the feed-motor 18 is turned on by the operator and that causes threaded lead screw 16 to rotate. This, in turn, causes gear 86 to rotate, which then causes gear 84 to rotate. Shaft 70 and, accordingly, output gear 64 are also turned, causing screw drive gear 60 and radial feed screw 40 to turn. Finally, the rotation of feed screw 40 causes tool holder 38 (carrying a tool not shown) to move up or down the slide bracket 36 depending on the direction of rotation of the lead screw 16, providing the desired overall radial movement of the tool.

The bar member 12, additionally, will be rotated about its longitudinal axis within the swivel mount brackets 22 and 24 in either of these two modes of operation discussed. This is accomplished, as in the Ricci et al. Pat. No. 6,447,220, by the drive means made up of the boring bar drive housing 19 and either an air motor 20 or a hydraulic motor 21. Therefore, the axial translation mode will result in a boring operation of a surrounding tubular workpiece. The axial movement of the cutting blade combined with the rotation of bar member 12 allows the inside diameter of the work piece being bored away and smoothed. The radial movement of the facing tool will result in a facing operation, which will slowly smooth the faces of flange surfaces the tool's blade comes into contact with.

PREFERRED SECOND EMBODIMENT

The alternative embodiment illustrated in FIGS. 5A–8 is similar in many respects to the above-described embodiment but it incorporates a modified control means for selectively causing the cutting head assembly to be axially translated along the length of the boring bar or for the tool holder forming part of the cutting head assembly to be radially translated when performing a flange facing operation. The feed motor, the boring bar drive housing and the mounting brackets for the bore bar are not shown, but they would be like those shown in FIG. 1.

Figure 5A:
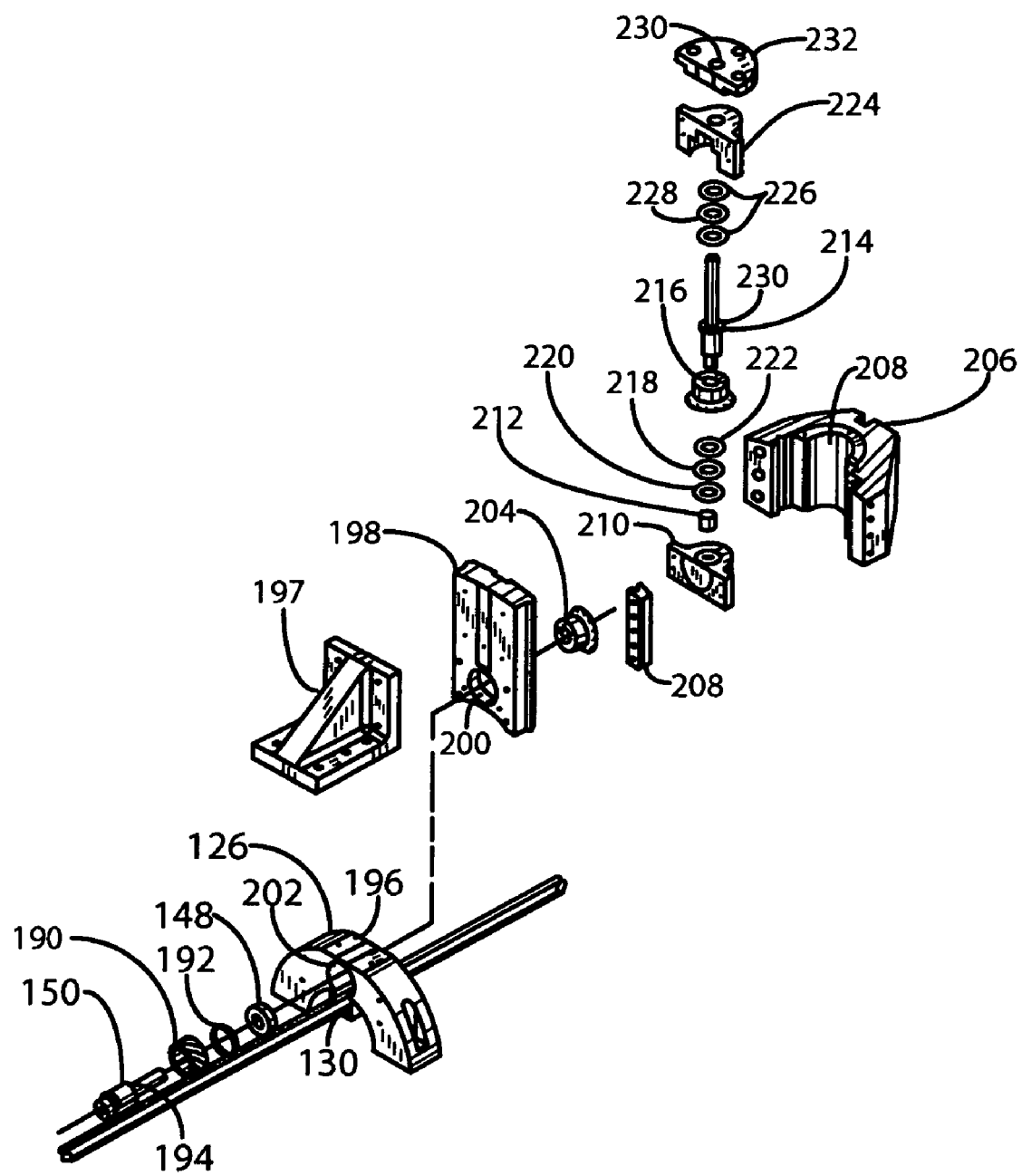
FIG. 5A and FIG. 5B together comprise an exploded view of an alternative embodiment of the invention.
Figure 5B:
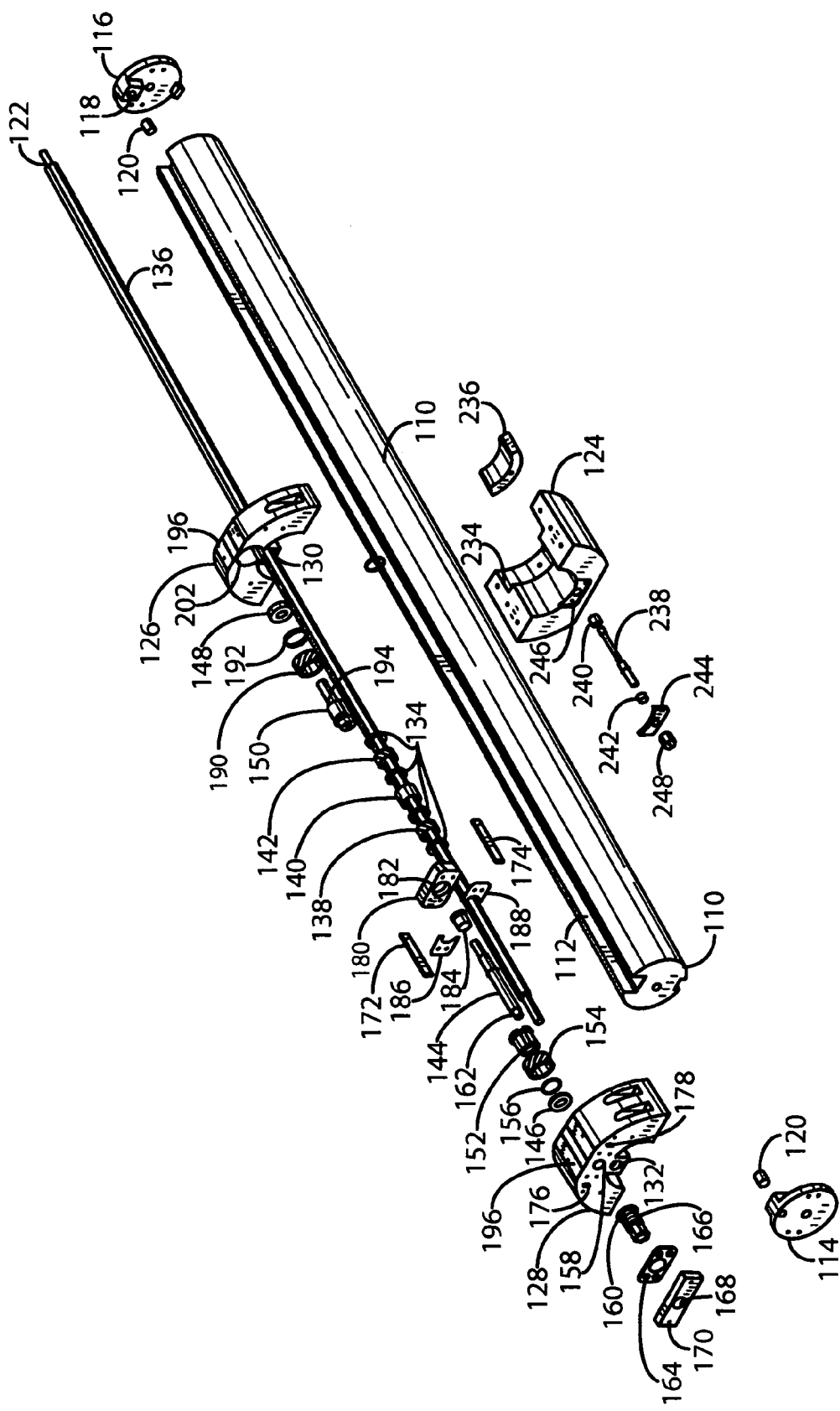

In FIGS. 5A and 5B, the boring bar itself is identified by numeral 110. Bore bar 110 is generally cylindrical except for the provision of a longitudinal groove 112 running the entire length thereof. The overall length of the boring bar 110 may be, for example, six feet and its outer diameter may be about 4 inches. However, the boring bar utilizing the present invention may be of a shorter or longer length and of a different diameter. End caps as at 114 and 116 are adapted to be bolted to the end surfaces of the boring bar 110 and inserted into an aperture 118 in each of the end plates is a bushing 120. The bushings journal a longitudinally-extending, threaded, feed screw 122 disposed in the groove 112 and, during use, is driven by a suitable prime mover, such as an electric or a hydraulic motor (not shown).

Slidably mounted on the boring bar 110 is a cutting head member comprising a lower collar 124 and a two-piece housing comprising housing members 126 and 128 which bolt to the collar 124. The threaded feed screw 122 extends through axial bores, as at 130 and 132 formed in the housing members 126 and 128, but is journaled for rotation by means of bushings 134 that fit into the bores 130 and 132.

The feed screw 122 has threads along the length thereof. For example, and without limitation, the threads may be ¾-10 ACME. Two flats, as at 136, are ground or otherwise formed along the length of the feed screw 122 and these flats mate with flat surfaces formed on the internal diameter of a toroidal shaped helical gear 138 that is arranged to slide on the feed screw 122. A spacer bushing 140 is also fitted over the feed screw 122 to maintain a desired separation between the helical gear 138 and a further helical gear 142. The helical gear 142 has a threaded internal diameter designed to mate with the threads on the feed screw 122.

The axial/radial feed control means includes a control shaft 144 that is journaled for rotation in the housing comprising housing members 126 and 128. More particularly, ball bearings 146 and 148 fit into the respective housing halves 128 and 126 and receive the radial feed control shaft 144 and a radial feed slide connector shaft 150 therein. Fitted onto the radial feed control shaft 144 is a taper lock adapter 152, a helical gear 154 that is keyed to the adapter 152 and a retainer nut 156 that secures the helical gear 154 onto the taper lock adapter 152.

When assembled, the left end of the radial feed control shaft 144 extends out through the aperture 158 that extends longitudinally through the housing member 128 to receive a radial feed actuator control nut 160 on the hex-shaped end 162 of the radial feed control shaft 144. A cover plate 164, when bolted to the outer face of the housing member 128, captures the flange on the actuator control nut 160 allowing it to be turned which, in turn, pulls and pushes adapter bar 170.

The actuator control nut 160 includes an externally threaded segment 166 that cooperates with internal threads 168 formed in a bore that extends through an adapter bar 170. A pair of rods 172, 174 of a generally oval cross-section extends through the oval bores 176 and 178 in the housing member 128 and is affixed at the ends thereof to the adapter bar 170. The other ends of the pair of rods 172 and 174 are screwed or otherwise fastened to the ends of a radial feed shaft retainer plate 180. The plate 180 includes a bore 182 through the center thereof and fitted into this bore is a taper lock member 184. A pair of retainer cover plates 186, 188 when bolted to the feed shaft retainer plate retains the taper lock member 184 in place within the bore 182 of the member 180.

The inner end of the radial feed control shaft 144 mates with the radial feed slide connector shaft 150 to which a further helical gear 190 is keyed. A further retainer nut 192 screws onto the threaded portion 194 of the radial feed slide connector shaft 150 to retain the helical gear 190 in place on that shaft.

When the housing members 126 and 128 are joined together and joined to the lower collar 124, a right angle facing head bracket 194 is bolted to flats 196 formed on the respective housing halves. Bolted to the vertical face of the right angle bracket 194 is a facing head slide member 198 and it includes a centrally located transverse bore 200 that becomes aligned with a bore 202 that is formed through the housing member 126 and that receives the outer end of the radial feed slide connector shaft 150 through it. Secured to the end of that shaft is a spiral miter gear 204.

Mounted to the slide plate 198 is the radial facing head tool block 206, which is capable of sliding in a radial direction, being held in place by a gib 208. The tool block 206 includes a generally semicircular bore 208 for containing the mechanism for radially translating the tool block member 206. This mechanism includes a housing 210 in which is fitted a bronze, oil-impregnated bushing 212 which journals a lower end of a feed screw 214. Keyed to the lower end of the feed screw 214 is a spiral miter gear 216 that is adapted to mesh with the miter gear 204. A thrust bearing 218 and thrust washers 220 and 222 are seen as being disposed between the oil impregnated bushing 212 and the miter gear 216. The upper end of the feed screw 214 is journaled in an upper housing 224 that is shaped with a semicircular contour allowing it to fit within the semicircular bore of the tool block 206. Thrust washers 226 and a thrust bearing 228 are disposed between a flange 230 on the feed screw 214 and the upper housing 224. The threaded shaft of the feed screw 214 cooperates with internal threads in a bore 230 of a feed nut 232 that is fastened by screws to the tool block 206 in a semicircular recess milled into the exposed upper surface of the tool block 206.

While not altogether necessary, the bore bar carrying a radial facing head as shown in the embodiment of FIG. 5 may also include a lock mechanism for holding the cutting head at a desired axial location along the length of the bar 110. As shown in FIG. 5B, the lower collar 124 may include an arcuate recess 234 into which is fitted a wedge member 236. The wedge member 236 is affixed to an end of a draw rod 238 that is journaled for rotation by a bushing 240 that is fitted into a longitudinal bore formed through the thickness dimension of the collar 124. The opposite end of the draw rod 238 is journaled in an Oilite bushing 242 that is captured in a cover member 244 that is held in place in a recess 246 on the collar 124 by screws (not shown). Finally, a hex nut 248 is attached to an exposed end of the draw rod 238.

Having described the constructional features of the alternative embodiment of FIGS. 5A and 5B, consideration will next be given to the manner in which the cutting head assembly can be selectively axially translated along the length dimension of the bore bar or radially translated when used in a facing operation.

Figure 6:
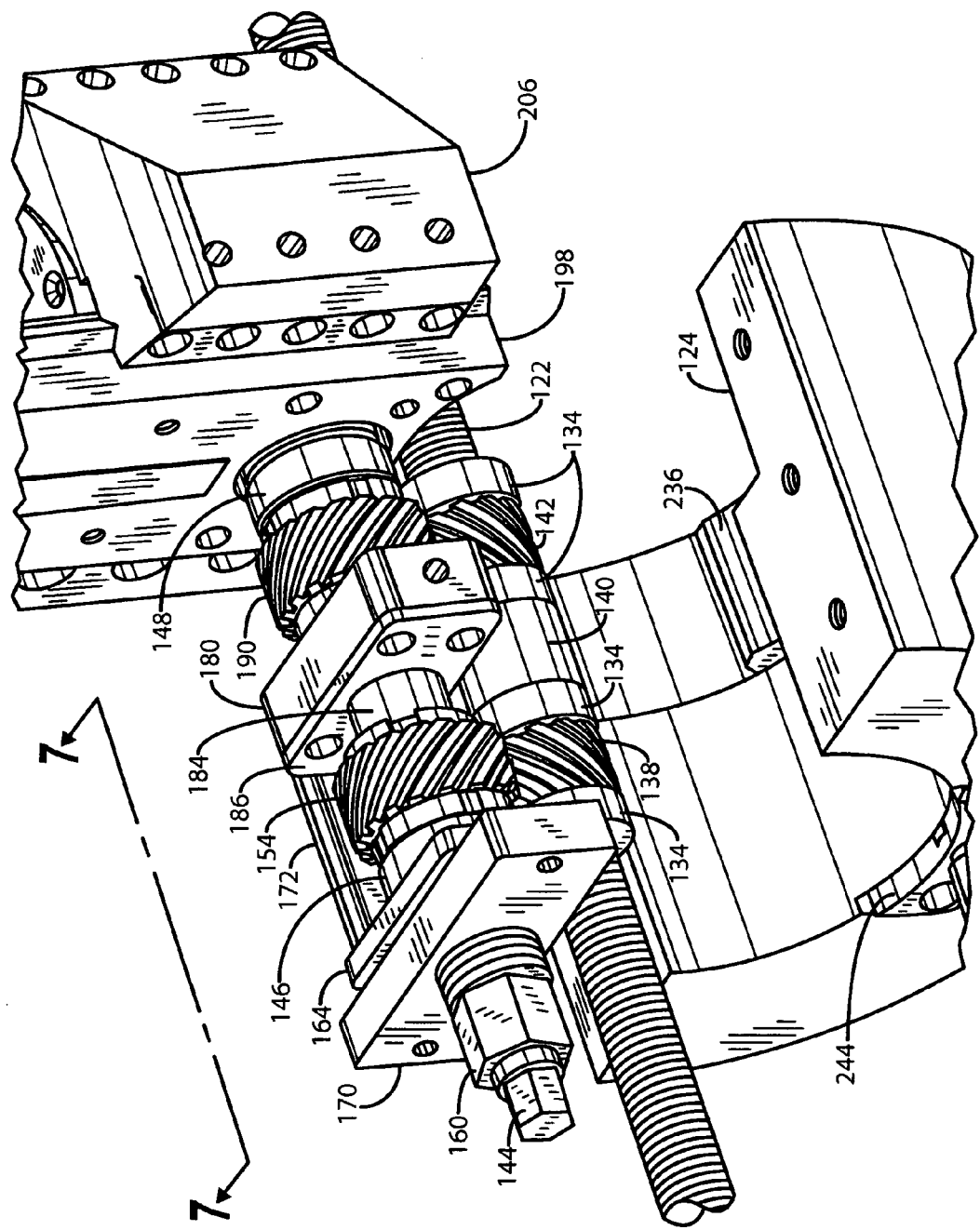
FIG. 6 is an exploded partial perspective view of the control means in the embodiment of FIG. 5 with the control means arranged for axial feed of the cutting head.

When it is desired to axially feed the cutting head assembly, it is essential that the helical gear 142 needs to remain fixed. The way in which the helical gear 142 will remain fixed is that helical gear 190 must be held fast and prevented from rotating. Referring then to FIG. 6, it can be seen that the tapered end of the slide connector shaft 150 is engaged with the bore formed in the end of the shaft retainer plate 180. When the actuator control nut 160 is turned with a wrench or similar tool in a first direction, the actuator bar 170 is displaced to push the radial feed shaft retainer plate 180 to the right when viewed in FIGS. 6 and 7, via the slide bars 172 and 174. In this condition, the radial feed shaft retainer plate 180 is made to engage the tapered surface on the slide connector shaft 150, preventing helical gear 190 from turning. Now, when the feed screw 122 is driven by a motor (not shown), it will axially feed the cutting head assembly to the right or left along the length of the bore bar 110 using the helical gear 142 as a traveling nut. It will be recalled that the ID of the helical gear 142 is threaded to mesh with the threads on the feed screw 122.

Figure 7:
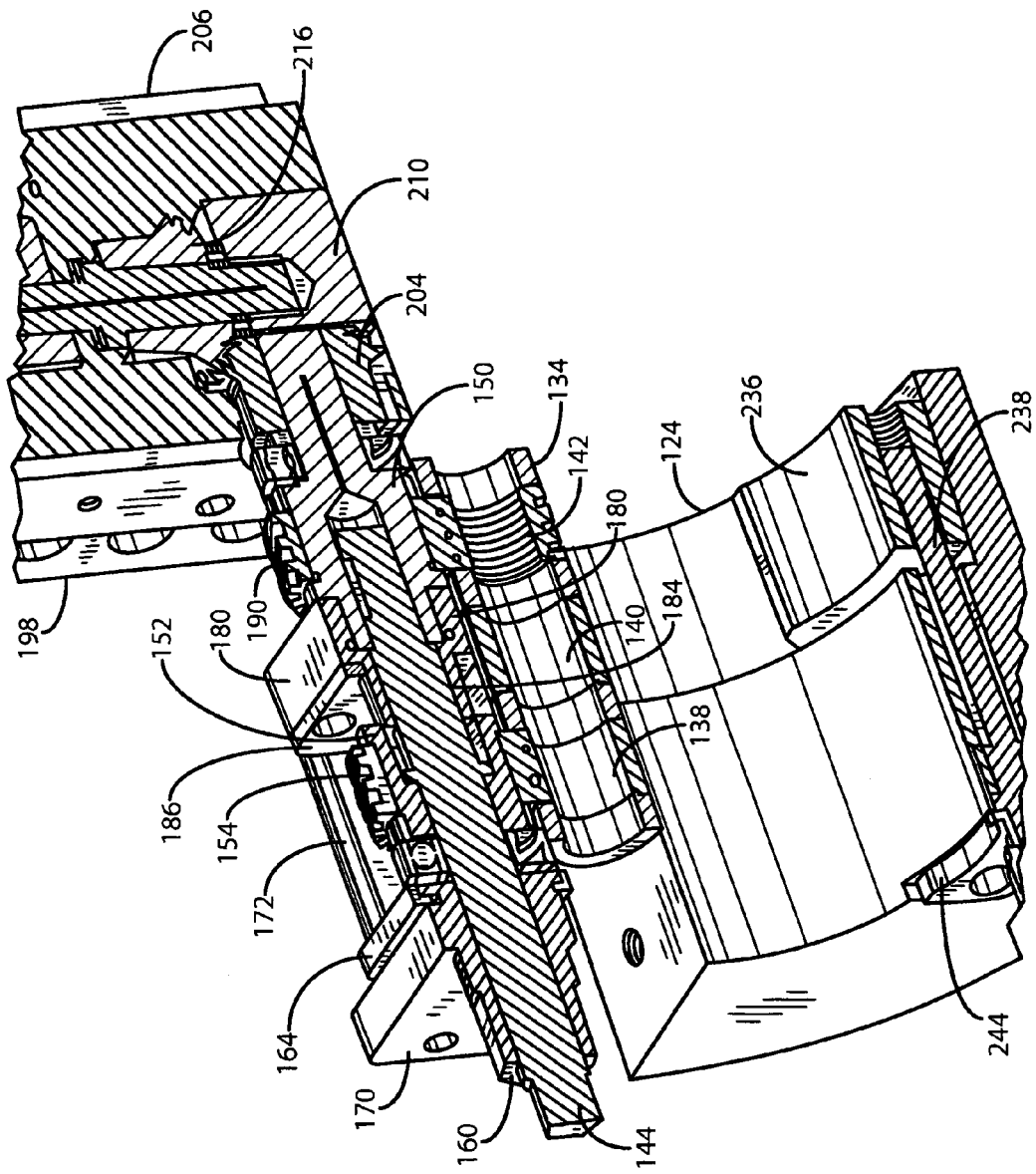
FIG. 7 is a vertical cross-sectional view taken along line 7—7 in FIG. 6.
Figure 8:
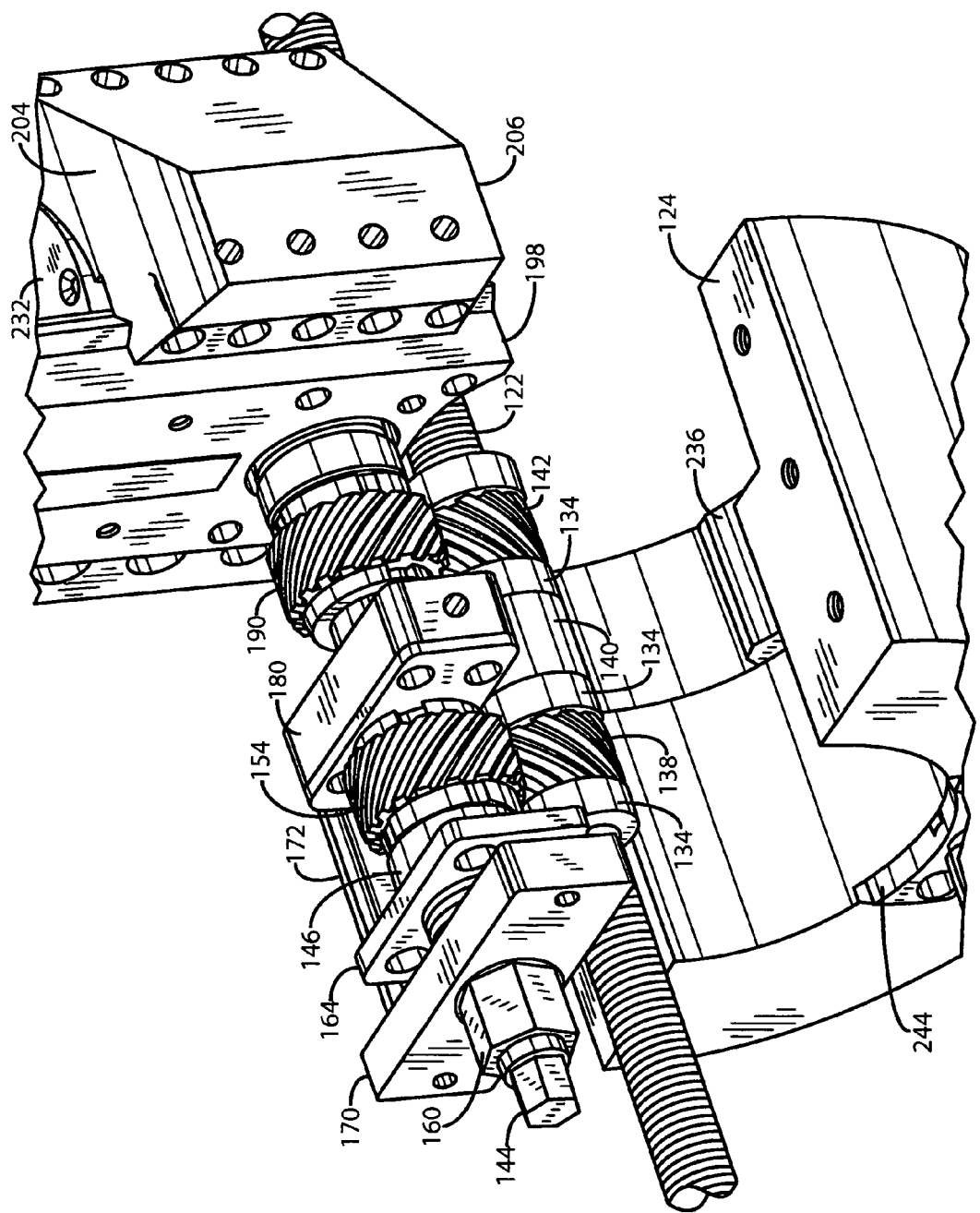
FIG. 8 is an exploded partial perspective view of the control means in the embodiment of FIGS. 5A and 5B with the control means arranged for radial feed of the tool slide on the cutting head.

Next, with reference to FIGS. 7 and 8 when the radial feed actuator control nut 160 is turned in the reverse direction, the radial feed actuator bar 170 will move in the opposite direction from that previously described, i.e., to the left and, in doing so, drag on the pair of bars 172 and 174 will pull the retainer plate 180 to the left. This disengages the radial feed slide connector shaft 150 from the retainer plate 180, thus allowing helical gear 190 to spin freely. The connector shaft 150 and the helical gear 190 are keyed together so as to rotate in a unitary fashion. When the shaft retainer plate 180 is pulled to the left, it has a rotating member that is attached to the taper lock member 184. The taper lock member 184 can now spin freely and, hence, the shaft 144 will be made to rotate carrying the helical gear 190 with it.

When the control nut is turned with wrench far enough, the tapered surface of the taper lock adapter 184 will engage the internal tapered surface of the taper lock adapter 152. In that helical gear 154 is keyed to item 152, they turn as one entity. When the feed screw 122 is rotated, it will rotate helical gear 138 that is machined to have a profile that mates with the flats 136 on the feed screw 122. It will be recalled that the feed screw has two flats 136 ground there along and that the helical gear 138 has its internal diameter provided with corresponding flats. Thus, as helical gear 138 rotates with the feed screw 122, gear 154 will be driven, as will parts 152 and 184 by virtue of their being keyed to the shaft 144. Because helical gear 190 is now turning, it will also turn helical gear 142 to nullify the actions of the threads on the ID of gear 142 since both it and the feed screw 122 now rotate in the same direction. This action, in turn, rotates the connector shaft 150 to which the miter gear 204 is secured. As the miter gear 204 rotates, it engages the miter gear 216 to thereby rotate the facing head feed screw 214. Depending upon the direction of rotation of the feed screw 122, the tool block 206 will slide up or down relative to the slide plate 198 and this is the mode of operation when flange facing is to be performed.

It can be seen, then, that the present invention provides an improved, versatile, efficient portable boring and facing machine. The result is that there is a more simple and scaled-back machine.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A metal working machine for reboring or refacing a workpiece comprising, in combination:
    (a) an elongated, generally cylindrical boring bar, the boring bar having a longitudinally extending groove formed inward from an exterior surface thereof;
    (b) an elongated feed screw journed for rotation within said groove;
    (c) first and second helical gears coaxially mounted on the feed screw, the first helical gear being slidable on the feed screw and the second helical gear being threaded on the feed screw;
    (d) an annular cutting head assembly disposed about the boring bar and rotatable therewith, the annular cutting head member having a slide supporting a tool block that is adapted to be moved in a radial direction with respect to a longitudinal axis of the boring bar;
    (e) a radial feed screw journaled for rotation on the slide and engaging a nut affixed to the tool block and a first miter gear keyed to the radial feed screw;
    (f) a control shaft disposed parallel to the longitudinal axis of the boring bar and journaled for rotation in the cutting head assembly, the control shaft supporting a third helical gear that meshes with the first helical gear and a fourth helical gear that meshes with the second helical gear;
    (g) a connector shaft coaxially aligned with the control shaft and having a second miter gear keyed to it to mesh with the first miter gear; and
    (h) a lock mechanism slidable on the control shaft for selectively locking and releasing the third and the fourth helical gears whereby locking the third and fourth helical gears from rotation while driving the feed screw translates the cutting head assembly along the boring bar and releasing the third and forth helical gears for rotation while driving the feed screw drives the radial feed screw while maintaining the cutting head assembly stationary.

2. The metal working machine as in claim 1 and further including means for positively locking the cutting head assembly to the boring bar.

3. The metal working machine as in claim 1 wherein the elongated feed screw includes a pair of flat surfaces running along substantially the entire length thereof.

4. The metal working machine as in claim 3 wherein the first helical gear includes flat surfaces on an internal diameter for engaging the pair of flat surfaces on the elongated feed screw to permit sliding of the first helical gear on the elongated feed screw and rotation of the first helical gear with the elongated feed screw.

5. The metal working machine as in claim 1 wherein the lock mechanism includes a frusto-conically tapered end portion on said connector shaft and a screw actuated retainer plate having a bore formed therein for receiving the tapered end portion with a predetermined frictional fit when the retainer plate is displaced in a first direction.

6. The metal working machine as in claim 5 and further including a taper lock operatively associated with the third helical gear and a frusto-conical projection on the retainer plate adapted to engage the taper lock when the retainer plate is displaced in a second direction opposite the first direction.

* * * * *